United States Patent [19]

Laakko

[11] Patent Number: 5,554,263
[45] Date of Patent: Sep. 10, 1996

[54] METHOD FOR REMOVING OR INSTALLING ROLLS IN A PAPER MACHINE OR THE LIKE

[75] Inventor: Ossi Laakko, Kokkola, Finland

[73] Assignee: EWM Technology Ltd. OY, Kokkola, Finland

[21] Appl. No.: 142,337

[22] PCT Filed: May 20, 1992

[86] PCT No.: PCT/FI92/00154

§ 371 Date: Nov. 23, 1993

§ 102(e) Date: Nov. 23, 1993

[87] PCT Pub. No.: WO92/20598

PCT Pub. Date: Nov. 26, 1992

[30] Foreign Application Priority Data

May 24, 1991 [FI] Finland ................................. 912531

[51] Int. Cl.$^6$ ....................................................... D21F 1/24
[52] U.S. Cl. ............................ 162/199; 162/272; 29/895
[58] Field of Search ................................. 162/272, 199; 294/74; 29/895

[56] References Cited

U.S. PATENT DOCUMENTS

| | | |
|---|---|---|
| 2,425,292 | 8/1947 | McCoy . |
| 3,658,191 | 4/1972 | Murphy . |
| 3,744,837 | 7/1973 | Foster . |
| 3,809,422 | 5/1974 | Schloyh ................................ 294/74 |
| 4,098,415 | 7/1978 | Mason .................................. 294/74 |
| 4,114,765 | 9/1978 | Kojima ................................. 294/74 |
| 4,608,125 | 8/1986 | Autio ................................... 162/272 |
| 4,657,634 | 4/1987 | Autio ................................... 162/272 |
| 4,826,572 | 5/1989 | Fukui et al. ........................ 162/272 |
| 5,124,001 | 6/1992 | Autio ................................... 162/272 |

OTHER PUBLICATIONS

The Way Things Work, Houghton Mifflin Co, Boston, Ma. (1988) pp. 60–63.

Primary Examiner—Brenda A. Lamb
Attorney, Agent, or Firm—Burns, Doane, Swecker & Mathis LLP

[57] ABSTRACT

The invention relates to a method for removing and installing rolls (2) in a paper machine or the like substantially in the longitudinal direction of the rolls. In the method, an auxiliary displacing means (3) is supported to a substantially horizontal support structure of the paper machine or the like above the roll (2) to be displaced, the auxiliary displacing means being mounted to move along the support structure; one end of the roll (2) to be displaced is fixed to the auxiliary displacing means (3) so as to be suspended from it, and the other end of the roll is supported by a displacing device; and the roll (2) is then moved by the displacing device substantially in the direction of the longitudinal axis of the roll so that the auxiliary displacing means (3) fixed to one end of the roll moves along the support structure (1) while the roll to be displaced moves with it.

13 Claims, 2 Drawing Sheets

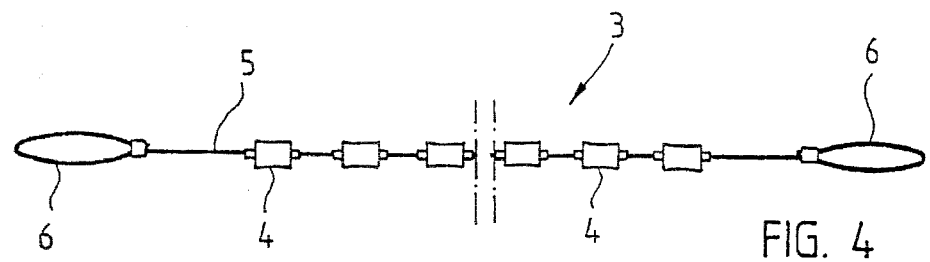
FIG. 4
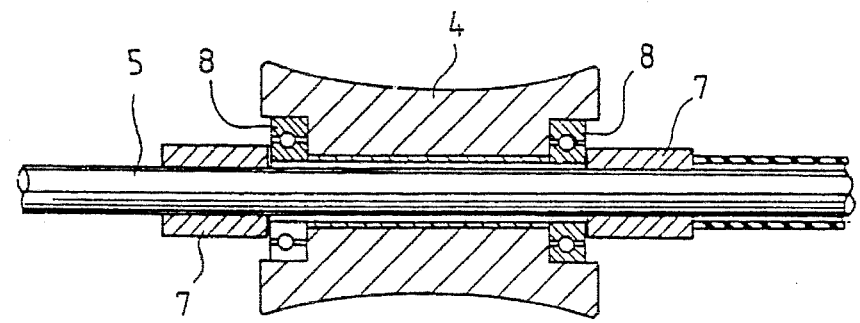
FIG. 5
FIG. 6(a)  FIG. 6(b)
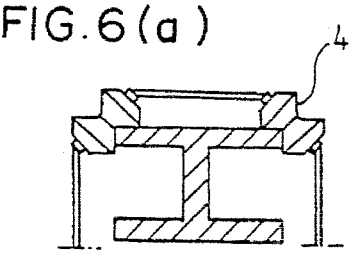 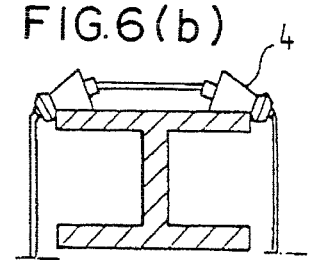
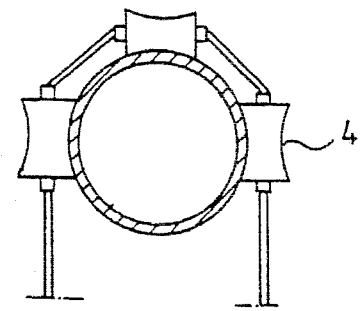
FIG. 6(c)
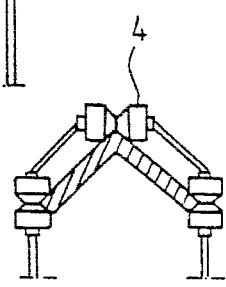
FIG. 6(e)
FIG. 6(d)

METHOD FOR REMOVING OR INSTALLING ROLLS IN A PAPER MACHINE OR THE LIKE

BACKGROUND OF THE SPECIFICATION

The invention relates to a method for removing and installing rolls in a paper machine or the like substantially in the direction of the longitudinal axis of the rolls. The method is intended for use especially in connection with paper machines, paper-board machines, cellulose machines, presses, etc.

Previously it has been very slow and difficult to remove and reinstall the auxiliary rolls and doctor blades of a paper machine, for instance. As such machines are positioned close to the wall and the ceiling structures, there is not room enough for conventional lifting and displacing devices, but the work has been done by human power by utilizing hoist blocks and other similar auxiliary means. The removal of a single auxiliary roll may have required a whole working day of four men.

U.S. Pat. No. 3,744,837 discloses a device for displacing elongated bodies. This device, primarily intended for use in pipe installations, is however unsuitable for use in narrow spaces as it has to be supported from above by means of a lifter.

OBJECTS AND SUMMARY

The object of the present invention is to eliminate the above problems and to provide a method which makes the handling of the above-mentioned objects decisively more rapid and easier. This object is achieved by means of a method according to the invention, which is characterized in that

- an auxiliary displacing means is supported to a substantially horizontal support structure of the paper machine or the like above the roll to be displaced, the auxiliary displacing means being mounted to move along the support structure;
- one end of the roll to be displaced is fixed immovably to the auxiliary displacing means so as to be suspended from it, and the other end of the roll to be displaced is supported by a displacing device; and
- the roll to be displaced is moved by the displacing device substantially in the direction of the longitudinal axis of the roll to be displaced so that the auxiliary displacing means fixed to one end of the roll to be displaced moves along the support structure while the roll to be displaced moves with it.

The invention is based on the idea that the structures already existing in the vicinity of the roll to be displaced are utilized as a support structure for the roll to be displaced, a simple auxiliary displacing means being fitted in the support structures. One end of the roll to be displaced is supported by the auxiliary displacing means so that the roll can be displaced by moving it from the other end by means of a suitable displacing or lifting device positioned outside the paper machine or the like.

When using the method according to the invention, the time required for removing or installing the roll is reduced by more than one half as compared with the previous methods.

The cost of the apparatus required for embodying the method is very low, as e.g. a wire rope provided with a rolling means may be advantageously used as the auxiliary displacing means. When the rolls of the paper machine or the like are to be displaced, such a wire rope is fitted around one roll, and so one end of the roll to be displaced is suspended therefrom. The displacing device, in turn, may be any device by means of which the other end of the roll can be supported and moved.

In the following the invention will be described in greater detail in connection with the removal of a roll of a paper machine set forth as an illustrating embodiment with reference to the attached drawings, in which

BRIEF DESCRIPTION OF THE DRAWINGS

FIG. 4 is an enlarged view of the auxiliary displacing means of FIGS. 2 and 3 when detached;

FIG. 5 is a cross-sectional view of the rolling means of the auxiliary displacing means shown in the preceding figures, illustrating the attachment of the rolling means to the wire rope of the auxiliary displacing means; and FIGS. 6a–6e show a few possible ways of realizing the slide fit between the auxiliary displacing means and different support structures.

DETAILED DESCRIPTION OF PREFERRED EMBODIMENTS

Figure 1:
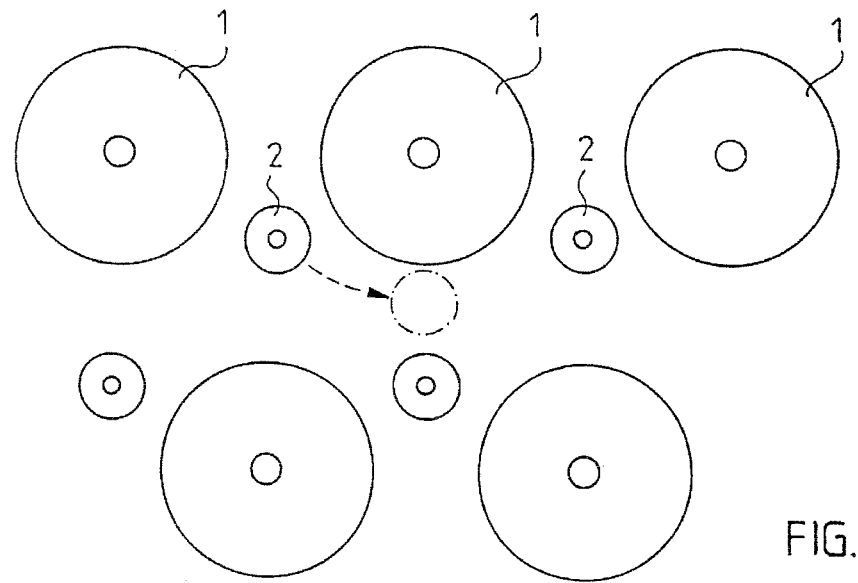
FIG. 1 is a schematic side view of a few rolls of the paper machine.
Figure 2:
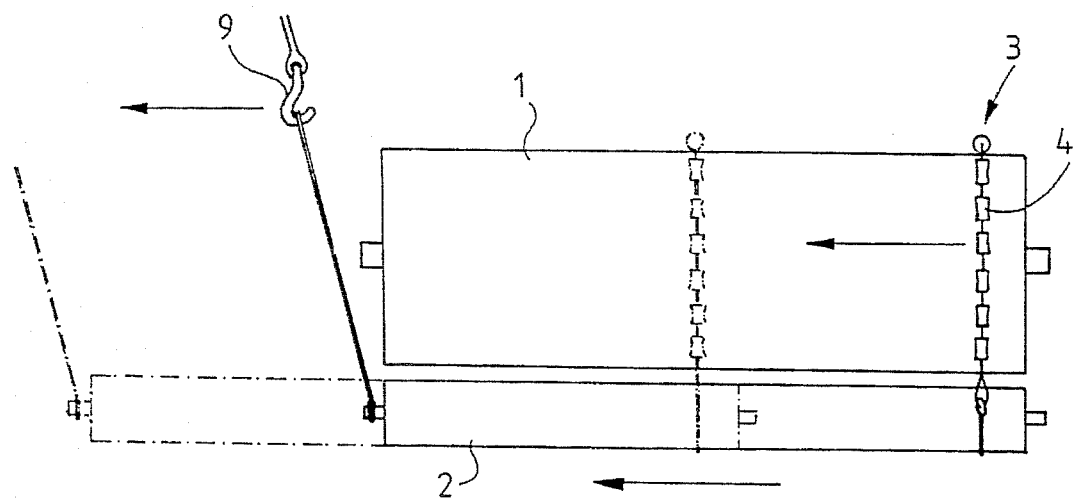
FIG. 2 shows two of the rolls of FIG. 1 as seen in the longitudinal direction of the paper machine, and the realization of the method according to the invention.
Figure 3:
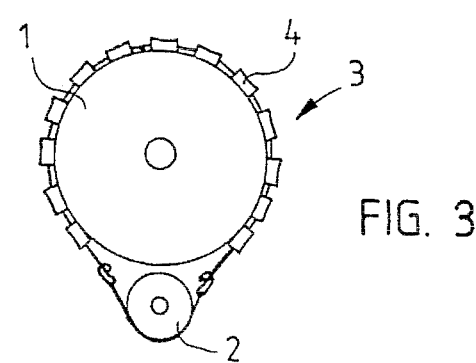
FIG. 3 shows the auxiliary displacing means according to the invention in connection with the rolls shown in FIG. 1 in the same direction as in FIG. 1.

The larger rolls indicated by the reference numeral 1 in FIGS. 1 to 3 may be e.g. drying rolls in a paper machine while the smaller rolls indicated by the reference numeral 2 are auxiliary rolls.

For example, when one of the auxiliary rolls 2 is to be removed from the paper machine by the method of the invention (see FIGS. 1 to 3), an auxiliary displacing means 3 provided with rolling means 4 is fitted around the roll 1. The auxiliary roll 2 is then detached from the frame structures of the paper machine so that it can be displaced below the roll 1, and one end of the auxiliary roll 2 is fixed immovably to the auxiliary displacing means 3 so as to be suspended from it. At the same time the other end of the auxiliary roll 2 is supported e.g. by an industrial lifter, of which only a lifting hook 9 is shown in the figures. The auxiliary roll 2 is then withdrawn out of the paper machine by the lifter substantially in the direction of the longitudinal axis of the roll and in the direction of the arrows shown in FIG. 2 while the auxiliary displacing means 3 fixed to one end of the auxiliary roll 2 slides along the surface of the roll 1.

FIG. 4 shows the auxiliary displacing means 3 used in the method described above, comprising a chain or a wire rope 5; mutually spaced rolling means 4 fitted in the chain or wire rope; and loops 6 formed by the end portions of the chain or wire rope 5 for fixing the roll to be displaced.

FIG. 5 is a more detailed view of the rolling means 4 of the auxiliary displacing means 3 shown in FIG. 4. The rolling means 4 are locked to the wire rope 5 by means of locking means 7 and bearings 8, and the surface of the rolling means is shaped so as to follow the surface of the support structure, in this specific case the surface of the roll 1. In this case, the rolling means may be made of e.g. nylon or teflon.

FIGS. 6a–6e show a few examples of support structures which can be used for supporting or carrying the auxiliary displacing means. The figure also shows how the rolling means 4 can be shaped to match with the displacing means. The support structures may be e.g. H-beams, L-beams, I-beams, U-beams, pipes, etc.

Even though the invention has been described above in connection with the removal of the roll of the paper machine, the use of the method according to the invention is not, of course, restricted to this, but the invention can be applied in all cases mentioned at the beginning of the specification. Similarly, the auxiliary displacing means used for realizing the method is by no means restricted to the displacing means described above, but it is possible to use any means which can be made to move easily along the support structure when one end of the roll to be displaced as described above is attached to it. Furthermore, the fixing of the auxiliary displacing means to the roll to be displaced can be realized in many different ways, e.g. by snap-action hooks, lifting loops, various hoist block means (so that no loops are needed in the auxiliary displacing means), etc.

I claim:

1. A method for removing and installing rolls in a paper machine substantially in a direction of a longitudinal axis of the rolls, comprising the steps of:

supporting an auxiliary displacing means to a substantially horizontal support structure of the paper machine above the roll to be displaced, the auxiliary displacing means being mounted to move longitudinally along the support structure;

fixing immovably one end of the roll to be displaced to the auxiliary displacing means so as to be suspended from it, and supporting the other end of the roll to be displaced by a displacing device; and moving the roll to be displaced by the displacing device substantially in the direction of the longitudinal axis of the roll to be displaced so that the auxiliary displacing means fixed to one end of the roll to be displaced moves longitudinally along the support structure while roll to be displaced moves with it;

wherein another roll positioned above the roll to be displaced is used as the support structure.

2. The method according to claim 1, wherein the displacing device is independent of the support structure and the auxiliary displacing means.

3. The method according to claim 2, wherein the displacing device is an industrial lifter.

4. The method according to claim 2, wherein the displacing device is a forklift truck.

5. The method according to claim 1, wherein the support structure is a dryer roll on the paper making machine.

6. A method for removing and installing rolls in a paper machine substantially in a direction of a longitudinal axis of the rolls, comprising the steps of:

supporting an auxiliary displacing means to a substantially horizontal support structure of the paper machine above the roll to be displaced, the auxiliary displacing means being mounted to move longitudinally along the support structure;

fixing immovably one end of the roll to be displaced to the auxiliary displacing means so as to be suspended from it, and supporting the other end of the roll to be displaced by a displacing device; and moving the roll to be displaced by the displacing device substantially in the direction of the longitudinal axis of the roll to be displaced so that the auxiliary displacing means fixed to one end of the roll to be displaced moves longitudinally along the support structure while the roll to be displaced moves with it;

wherein the auxiliary displacing means is a wire rope, the wire rope being suspended from the support structure so that the wire rope forms a loop around the support structure and hangs down from the support structure.

7. The method according to claim 6, wherein the displacing device is independent of the support structure and the auxiliary displacing means.

8. The method according to claim 7, wherein the displacing device is an industrial lifter.

9. The method according to claim 8, further comprising rollers mounted on said wire rope.

10. The method according to claim 7, wherein the displacing device is a forklift truck.

11. The method according to claim 10, further comprising rollers mounted on said wire rope.

12. The method according to claim 7, further comprising rollers mounted on said wire rope.

13. The method according to claim 6, further comprising rollers mounted on said wire rope.

* * * * *